May 15, 1956
W. A. BEDFORD, JR
2,745,156
FASTENER DEVICE
Filed Feb. 12, 1948
2 Sheets-Sheet 1
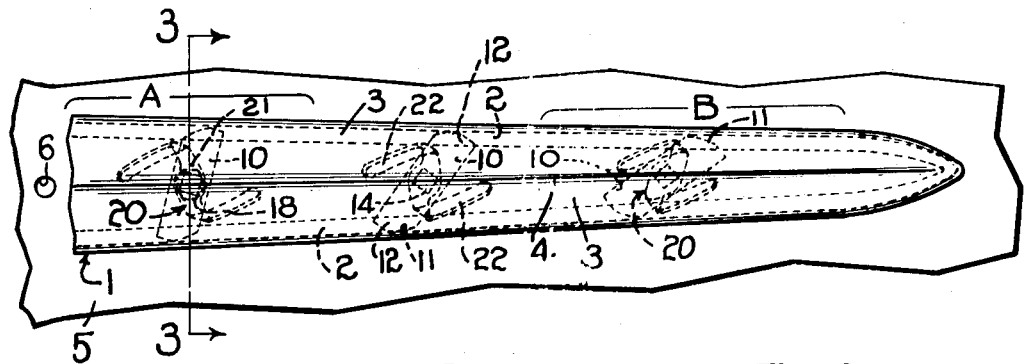
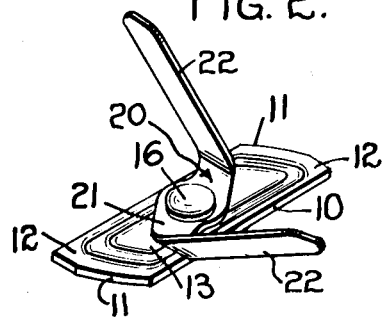
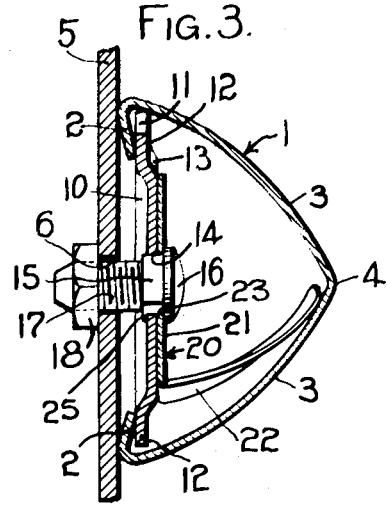
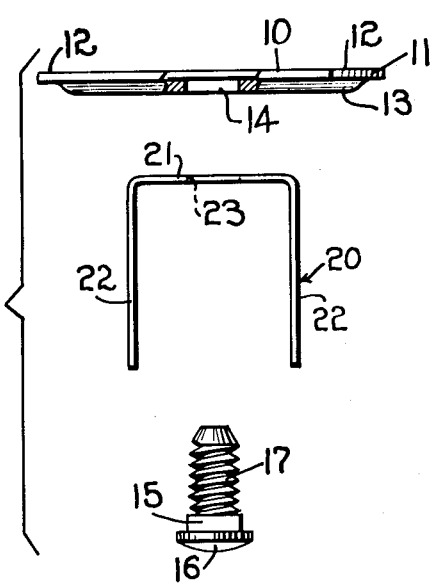
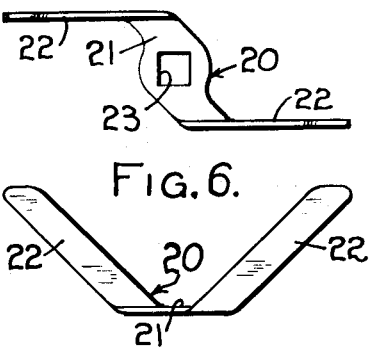
*INVENTOR.*
WILLIAM A. BEDFORD JR.
BY Philip E. Parker
ATTORNEY.

May 15, 1956   W. A. BEDFORD, JR   2,745,156
FASTENER DEVICE

Filed Feb. 12, 1948   2 Sheets-Sheet 2

*INVENTOR.*
WILLIAM A BEDFORD JR.
BY *Philip E. Parker*
*ATTORNEY.*

United States Patent Office 2,745,156
Patented May 15, 1956

2,745,156

FASTENER DEVICE

William A. Bedford, Jr., North Scituate, Mass., assignor, by mesne assignments, to United-Carr Fastener Corporation, Boston, Mass., a corporation of Delaware Application February 12, 1948, Serial No. 7,951

7 Claims. (Cl. 24—73)

The present invention relates to molding fasteners of the type employed for securing a channel shaped molding to a support, and aims generally to improve existing fasteners of that type.

One of the primary objects of the invention is the provision of an improved molding fastener suitable for application to a molding of the type having a longitudinal taper in width as well as depth.

A further object of the invention is the provision of an improved molding fastener that will have secure fastening engagement with both the inturned flanges as well as the wall of a molding tapering in both width and depth, or with moldings of different widths and depths whereby said moldings may be readily and economically attached to an apertured support.

The above and other objects of the invention will be apparent to persons skilled in the art by reference to the accompanying drawings and to the annexed specification illustrating and describing a preferred embodiment of the invention.

In the drawings—

Fig. 1 is a front elevation of a portion of a longitudinally tapered molding secured to a support by means of concealed fasteners of the present invention, which are indicated in dotted lines;

Fig. 2 is a perspective view of one form of improved molding fastener;

Fig. 3 is an enlarged transverse sectional view of the installation shown in Fig. 1, as taken on the line 3—3 thereof and illustrating the position of the fastener in locking engagement with the inturned flanges and wall of the molding;

Fig. 4 is an edge elevation of the component parts of the fastener in disassembled relation;

Fig. 5 is a plan view of the tensioning element of the fastener;

Fig. 6 is a side elevation thereof;

Figure 7:
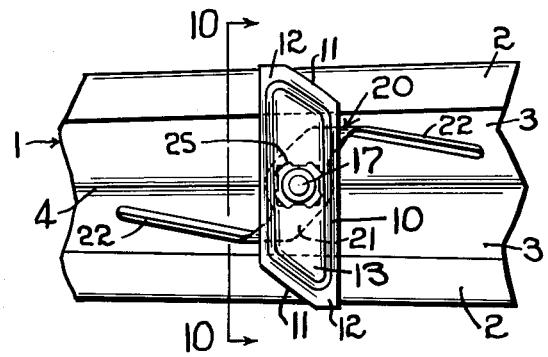
Fig. 7 is an elevation, viewed from the inner side of a molding and illustrating the initial position of the fastener as being applied to the molding.
Figure 8:
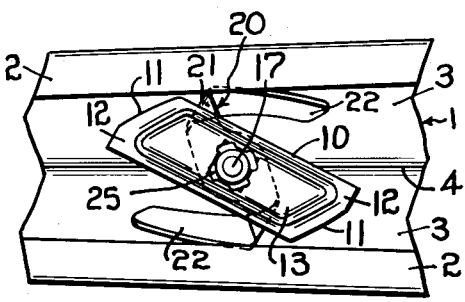
Fig. 8 is a view similar to Fig. 7 and illustrating the second or intermediate position of the fastener when being applied to the molding.

The fasteners of the present invention are particularly adapted for securing a molding 1 and the like to a support 5 having an aperture 6 therein. The molding 1 may be of any desired size or shape and may be of the type that tapers in width and depth longitudinally from a wider and deeper section A to a narrower and shallower section B. Preferably the molding 1 is hollow or of channel form and is provided with spaced opposed base flanges 2 inturned from the base edges of converging faces 3 which meet at an apex or ridge 4, thus forming a molding of substantially triangular cross section.

The fastener preferably comprises a base plate 10, desirably of elongated rectangular form, of substantially greater length than width, and provided with diagonally opposed rounded or bevelled edges 11 presenting molding flange-engaging portions 12. The plate 10 may be formed of relatively thin sheet metal, and may be centrally embossed or pressed as at 13, to add stiffness to the plate. The plate 10 is provided with an aperture 14 to receive non-rotatably an attaching screw or the like, and preferably the aperture 14 is square to receive the square shank 15 of a headed screw 16 having a threaded stem 17 adapted to be inserted through the support aperture 6 and to be retained therein by a nut 18 threaded thereon.

The fastener includes a tensioning member 20 of novel construction having resilient arms or fingers adapted to engage and bear against the inner walls of the angularly disposed converging faces 3. Advantageously the tensioning member 20 may be formed of thin ribbon spring metal bent to substantially U-shaped form (Fig. 4) to provide a base 21 and molding wall-engaging arms or fingers 22. The base 21 is apertured at 23 to receive the screw 17 and preferably the aperture 23 is square to receive the squared portion 15 of the screw, though other means may be employed to non-rotatably secure the tensioning member to the plate. The arms or fingers 22 on opposite ends of the base 21 extend in opposite directions therefrom (see Fig. 5) and with the base 21 form a substantially V-shaped tensioning member as shown in Fig. 6. Preferably the arms or fingers 22 extend laterally beyond the side edges of the plate 10 and the base portion 21 of the tensioning member is so positioned on the plate 10 that the arms 22 lie generally in the plane in substantial continuation of the bevelled or rounded end edges 11 of the plate 10 as shown in Figs. 1, 7, 8 and 9.

The tensioning member 20 may be permanently non-rotatably assembled with the plate 10 and screw 16 by upsetting the corner portions of the squared shank 15 of the screw over the plate 10 as shown at 25 in Figs. 3, 7, 8 and 12.

Figure 9:
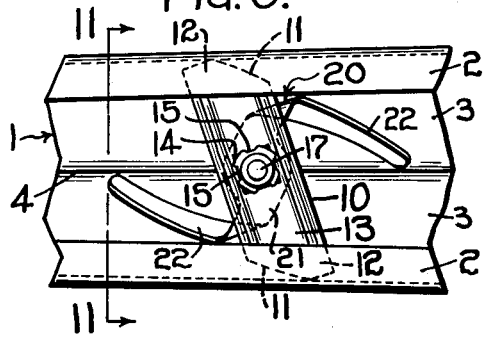
Fig. 9 is a view similar to Figs. 7 and 8 and illustrating the final position of the fastener applied to the molding.
Figure 10:
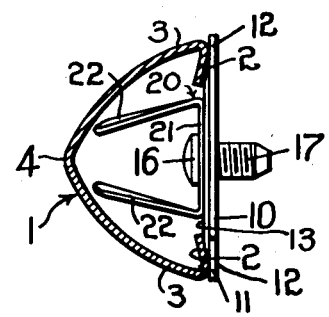
Fig. 10 is a transverse sectional view as taken on the line 10—10 of Fig. 7.
Figure 11:
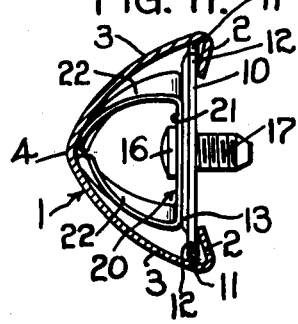
Fig. 11 is a transverse sectional view as taken on the line 11—11 of Fig. 9.

In Figs. 7 to 13 inclusive I have illustrated a manner of applying the fastener to a molding 1 preparatory to being secured to the apertured support 5. Referring to Figs. 7 and 10, the fastener is initially applied to the molding with the arms 22 disposed longitudinally of the molding between the flanges 2 thereof and the plate 10 disposed transversely of the flanges 2. In this position the arms 22 are positioned inwardly of the molding, and may be out of contact with the inner faces of the converging molding walls 3, as shown in Fig. 10. The fastener may then be turned in a counter-clockwise direction to the position shown in Fig. 8 wherein the plate 10 is between the molding flanges 2, so that the plate 10 may be pushed to a position inwardly of the flanges 2 preparatory to being rotated in a clockwise direction with the portions 12 of the plate 10 bearing against the inner faces of the flanges 2 as shown in Figs. 9 and 11. The spring arms or fingers 22 are sufficiently flexible to permit being curved inwardly as well as twisted (as shown in Fig. 11) so as to tensionally bear against the inner faces of the convergent walls 3 adjacent the apex or ridge 4 and thus hold the fastener in the installed position of the molding 1.

If the fasteners are not initially positioned in the molding in the exact location that will permit registry of the screw stems 17 with the openings 6 of the support 5, they may be readily slid longitudinally in the molding channel to proper position. The fasteners may thus be assembled with and retained in the molding in desired position ready for attachment to the support 5.

Figure 12:
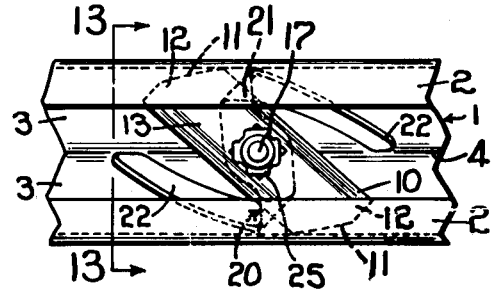
Fig. 12 is a view similar to Fig. 9 and illustrating the position of the fastener in final position applied to a narrower and shallower section of molding than that illustrated in Fig. 9.
Figure 13:
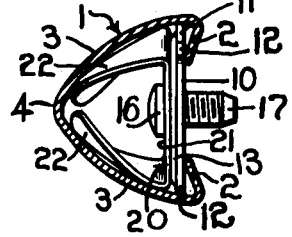
Fig. 13 is a transverse sectional view taken on the line 13—13 of Fig. 12.

In Figs. 12 and 13 the fastener is illustrated as applied to a narrower and shallower molding or section like that shown in Figs. 7 to 11. It will be noted in Fig. 12 that the plate 10 will be locked under the molding flanges when rotated to a more oblique position than in Fig. 7, due to the narrower width of the molding, and the arms 22 will be depressed closer to the plane of the plate 10 due to the shallower depth of the molding.

It will be understood that the fastener of the present invention is not restricted in use to moldings of tapering width and depth as herein illustrated and described, but are adaptable to moldings of different widths and depths.

While I have illustrated and described a preferred construction of fastener embodying the invention, I do not intend to be restricted to the details thereof, as the scope of the invention is best defined in the appended claims.

I claim:

1. A molding fastener comprising a molding flange-engaging plate, support-engaging means on said plate, a U-shaped molding body-engaging member having its bight portion secured to said plate and its legs disposed in planes at right angles thereto, said legs extending from said plate in directions oblique to a plane normal to said plate.

2. A molding fastener comprising an elongated flange-engaging plate, a support-engaging member secured to said plate and extending from one side thereof in a direction normal to the plane of said plate to provide an axis about which said plate may be turned to engage flanges of moldings of various widths, and a tensioning member secured to an opposite side of said plate and having laterally and transversely bent spaced resilient fingers extending outwardly therefrom, the end portions of said fingers being freely flexible to be flexed by a molding wall toward the plane of said plate whereby said fastener may be placed in tensional engagement with moldings of varying widths and depths.

3. A molding fastener comprising an elongated flange-engaging plate, a support-engaging member secured to said plate and extending from one side thereof in a direction normal to the plane of said plate to provide an axis about which said plate may be turned to engage flanges of moldings of various widths, and a tensioning member secured to an opposite side of said plate and having spaced resilient fingers of thin strip spring material extending outwardly therefrom and disposed in opposing spaced planes normal to the plane of said plate, the end portions of said fingers being freely flexible to be flexed by a molding wall toward the plane of said plate whereby said fastener may be placed in tensional engagement with moldings of varying widths and depths.

4. A molding fastener comprising an elongated flange-engaging plate, a support-engaging member secured to said plate and extending from one side thereof in a direction normal to the plane of said plate to provide an axis about which said plate may be turned to engage flanges of moldings of various widths, and a tensioning member secured to an opposite side of said plate and having laterally and transversely bent spaced resilient fingers of thin strip spring material extending outwardly from opposite sides of said plate, the end portions of said fingers being freely flexible to be flexed by a molding wall toward the plane of said plate whereby said fastener may be placed in tensional engagement with moldings of varying widths and depths.

5. A molding fastener comprising a molding flange-engaging member, a support-engaging means on said member, and a tensioning member secured to one side of said flange-engaging member, said tensioning member having a base portion providing opposed ends and opposite side edges between said ends, and a resilient finger extending upwardly from each of said ends and laterally beyond said side edges.

6. A molding fastener comprising a molding flange-engaging member, a support-engaging means on said member, and a tensioning member secured to one side of said flange-engaging member, said tensioning member having a base portion providing opposed ends and opposite side edges between said ends, and a resilient finger integral with each of said ends and extending upwardly from the plane of said base, said fingers extending laterally beyond said side edges, and said fingers having flat surfaces disposed in planes oblique to the plane of said base portion.

7. A molding fastener comprising a molding flange-engaging member, support-engaging means on said member, and a tensioning member secured to one side of said flange-engaging member, said tensioning member having a base portion providing opposed ends and opposite side edges between said ends, and a resilient finger integral with each of said ends and extending upwardly from the plane of said base, said fingers extending laterally beyond said side edges in diverging directions.

References Cited in the file of this patent

UNITED STATES PATENTS

| Number | Name | Date |
|---|---|---|
| 1,811,262 | De Sana | June 23, 1931 |
| 2,148,847 | Wiley | Feb. 28, 1939 |
| 2,168,721 | Tinnerman | Aug. 8, 1939 |
| 2,207,374 | Fernberg | July 9, 1940 |
| 2,531,351 | Churchill | Nov. 21, 1950 |